US010293665B2

(12) United States Patent
Nakamura et al.

(10) Patent No.: US 10,293,665 B2
(45) Date of Patent: May 21, 2019

(54) LAMINATED GLASS AND AUTOMOBILE DOOR

(71) Applicant: AGC Inc., Chiyoda-ku (JP)

(72) Inventors: Atsushi Nakamura, Chiyoda-ku (JP); Daisuke Yamada, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 43 days.

(21) Appl. No.: 15/612,559

(22) Filed: Jun. 2, 2017

(65) Prior Publication Data

US 2017/0349033 A1 Dec. 7, 2017

(30) Foreign Application Priority Data

Jun. 3, 2016 (JP) ................................ 2016-111690

(51) Int. Cl.
*B60J 1/17* (2006.01)
*B32B 17/06* (2006.01)
(Continued)

(52) U.S. Cl.
CPC ................ *B60J 1/17* (2013.01); *B32B 17/06* (2013.01); *B32B 17/066* (2013.01);
(Continued)

(58) Field of Classification Search
CPC . B32B 17/06; B32B 17/066; B32B 17/10036; B32B 17/10174;
(Continued)

(56) References Cited

U.S. PATENT DOCUMENTS 4,788,794 A * 12/1988 Miller ........................ B60J 1/17 49/211
5,095,655 A * 3/1992 Warren .................... B60J 10/24 49/374
5,622,662 A * 4/1997 Veiga ........................ B32B 5/18 264/45.3
5,948,499 A * 9/1999 Tsukada ................... B60J 10/75 428/90

(Continued)

FOREIGN PATENT DOCUMENTS

JP 2000-272937 10/2000
JP 3849453 B2 * 11/2006 ............... B01J 1/17

OTHER PUBLICATIONS

[NPL-1] JP 3,849,453 B2 (Nov. 22, 2006) (JPP Machine Translation to English). (Year: 2006).*

(Continued)

*Primary Examiner* — David Sample
*Assistant Examiner* — Donald M Flores, Jr.
(74) *Attorney, Agent, or Firm* — Oblon, McClelland, Maier & Neustadt, L.L.P.

(57) ABSTRACT

A laminated glass provided in an automobile door panel including two panel boards facing each other and seal members provided on facing surfaces of the panel boards at regions along a beltline, the laminated glass being openable and closable by being provided between the two panel boards so as to slide between the seal members, the laminated glass includes: a laminated glass main body including at least two glass plates and an interlayer film sandwiched between the glass plates and having a storage modulus G' of $1.5\times10^6$ Pa or more; and a viscoelastic member provided on a surface of the laminated glass main body, the viscoelastic member abutting on the seal member or the panel board and sealing a gap between the seal member or the panel board and the laminated glass main body, at a closed time of the laminated glass.

19 Claims, 5 Drawing Sheets

CLOSED TIME

OPENED TIME

(51) Int. Cl.
*B32B 17/10* (2006.01)
*B60J 10/50* (2016.01)
*B60J 10/75* (2016.01)

(52) U.S. Cl.
CPC .... *B32B 17/10036* (2013.01); *B32B 17/1077* (2013.01); *B32B 17/10174* (2013.01); *B32B 17/10293* (2013.01); *B32B 17/10761* (2013.01); *B32B 17/10788* (2013.01); *B60J 10/50* (2016.02); *B60J 10/75* (2016.02); *B32B 2605/006* (2013.01); *B32B 2605/08* (2013.01); *Y10T 428/26* (2015.01)

(58) Field of Classification Search
CPC ........ B32B 17/10293; B32B 17/10761; B32B 17/1077; B32B 17/10788; B32B 2605/006; B32B 2605/08; B60J 1/17; Y10T 428/26
See application file for complete search history.

(56) References Cited

U.S. PATENT DOCUMENTS

| | | | | |
|---|---|---|---|---|
| 7,361,292 | B2 * | 4/2008 | Zhou | B32B 17/10293 252/511 |
| 2010/0233453 | A1 * | 9/2010 | Hashimoto | B32B 17/10018 428/216 |
| 2017/0028830 | A1 * | 2/2017 | Yamada | B60J 10/50 |
| 2017/0028831 | A1 * | 2/2017 | Yamada | B60J 10/50 |
| 2017/0253010 | A1 * | 9/2017 | Lu | G02B 27/0149 |
| 2017/0274740 | A1 * | 9/2017 | Kosaka | B32B 3/30 |

OTHER PUBLICATIONS

[NPL-2] "MTS-20 Product Data Sheet", (May 29, 2015) [original document with machine translation to English]; <https://www.hrc.co.jp/item/comfortable/mts/MTS-20.pdf>. (Year: 2015).*

* cited by examiner

OPENED TIME
CLOSED TIME
P1
P2
A
A'
A''

OPENED TIME
CLOSED TIME
P1
P2
A
A'
A"

OPENED TIME
CLOSED TIME
3
41
411
412
421
422
42
2
21
22
P2
P1
13C
Sa
Sb
11
11A
11B
12
1B
A
A'
A"

LAMINATED GLASS AND AUTOMOBILE DOOR

CROSS-REFERENCE TO RELATED APPLICATIONS

This application is based upon and claims the benefit of priority from the prior Japanese Patent Application No. 2016-111690, filed on Jun. 3, 2016 the entire contents of which are incorporated herein by reference.

FIELD

The present invention relates to a laminated glass and an automobile door, and particularly, relates to a laminated glass for an automobile door that has a high rigidity and is capable of achieving a high sound insulating property when being installed in an automobile door and an automobile door including the laminated glass.

BACKGROUND

In recent years, in order to achieve a weight reduction of an automobile, weight reductions of various composing members have been challenged. Among them, the laminated glass to be used as an openable and closable window glass in an automobile door has also been required to be reduced in weight. Further, the laminated glass of the automobile door has been required to have a sound insulating property that allows blocking of wind noises and body vibration sounds during running conventionally. The laminated glass typically has a composition in which an interlayer film is sandwiched between a pair of glass plates, and as for the laminated glass for an automobile door, there has been known a technique of enhancing the sound insulating property by adjusting materials and a composition of the interlayer film (see Patent Reference 1 (JP-A 2000-272937), for example).

To reduce the thickness of the glass plate is considered to contribute to the weight reduction of the laminated glass, but it causes a significant concern that the thinner glass plate necessarily entails a reduced strength of the laminated glass. Thus, by increasing rigidity while maintaining a sound insulating property of the interlayer film, the sound insulating property, the weight reduction, and the strength maintenance of the laminated glass are tried to be achieved at the same time. However, use of a highly rigid interlayer film causes a phenomenon in which the sound insulating property deteriorates in a specific frequency region, to thus be a problem.

SUMMARY OF THE INVENTION

The present invention has been made from the above-described viewpoints, and an object thereof is to provide laminated glass for an automobile door that is capable of being reduced in weight by having a high rigidity and at the same time, capable of achieving a high sound insulating property when being installed in an automobile door, and an automobile door that includes the laminated glass and has excellent sound insulating performance while corresponding to a weight reduction.

A laminated glass according to the present invention is a laminated glass provided in an automobile door panel including two panel boards facing each other and seal members provided on facing surfaces of the panel boards at regions along a beltline, the laminated glass being openable and closable by being provided between the two panel boards so as to slide between the seal members, the laminated glass including:

a laminated glass main body including at least two glass plates and an interlayer film sandwiched between the glass plates and having a storage modulus G' of $1.5\times10^6$ Pa or more measured by a dynamic viscoelasticity test under a condition at a frequency of 1 Hz, a dynamic shearing strain of 0.015%, and a temperature of 20° C.; and a viscoelastic member provided on a surface of the laminated glass main body, the viscoelastic member abutting on the seal member or the panel board and sealing a gap between the seal member or the panel board and the laminated glass main body, at a closed time of the laminated glass.

An automobile door according to the present invention includes the laminated glass according to the present invention.

According to the present invention, it is possible to provide laminated glass for an automobile door that is capable of being reduced in weight by having a high rigidity and at the same time, capable of achieving a high sound insulating property when being installed in an automobile door, and an automobile door that includes the laminated glass and has excellent sound insulating performance while corresponding to a weight reduction.

MODE FOR CARRYING OT THE INVENTION

Hereinafter, there will be explained embodiments of a laminated glass and an automobile door according to the present invention with reference to the drawings. It should be noted that the present invention is not limited to these embodiments, and these embodiments may be changed or modified without departing from the spirit and scope of the present invention.

Figure 1:
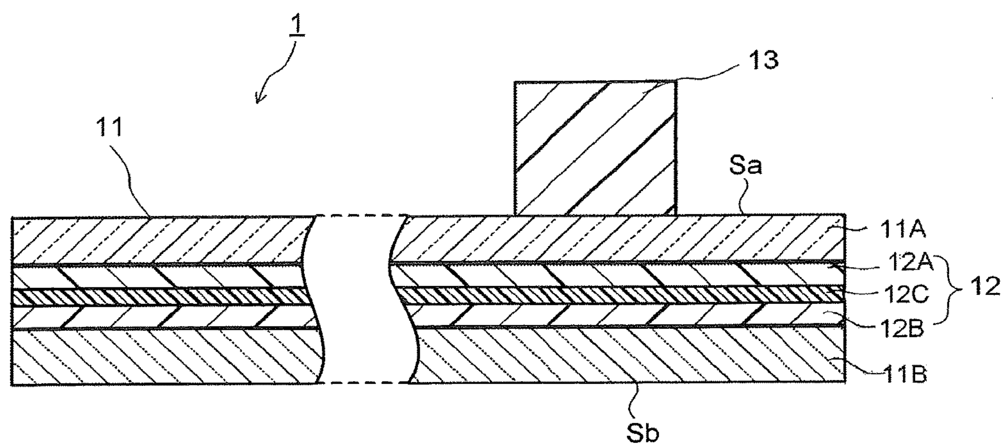
FIG. 1 is a cross-sectional view of a laminated glass according to an embodiment.
Figure 2:
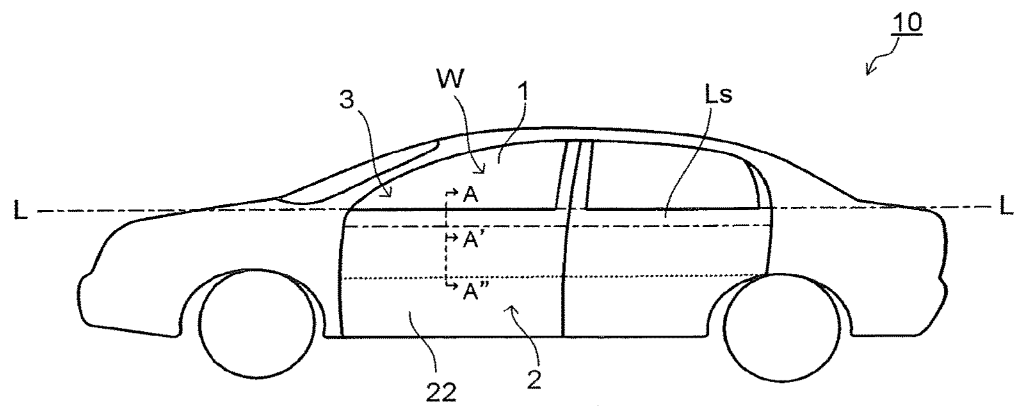
FIG. 2 is a side view of an automobile in which an automobile door including the laminated glass according to the embodiment is installed.
Figure 3:
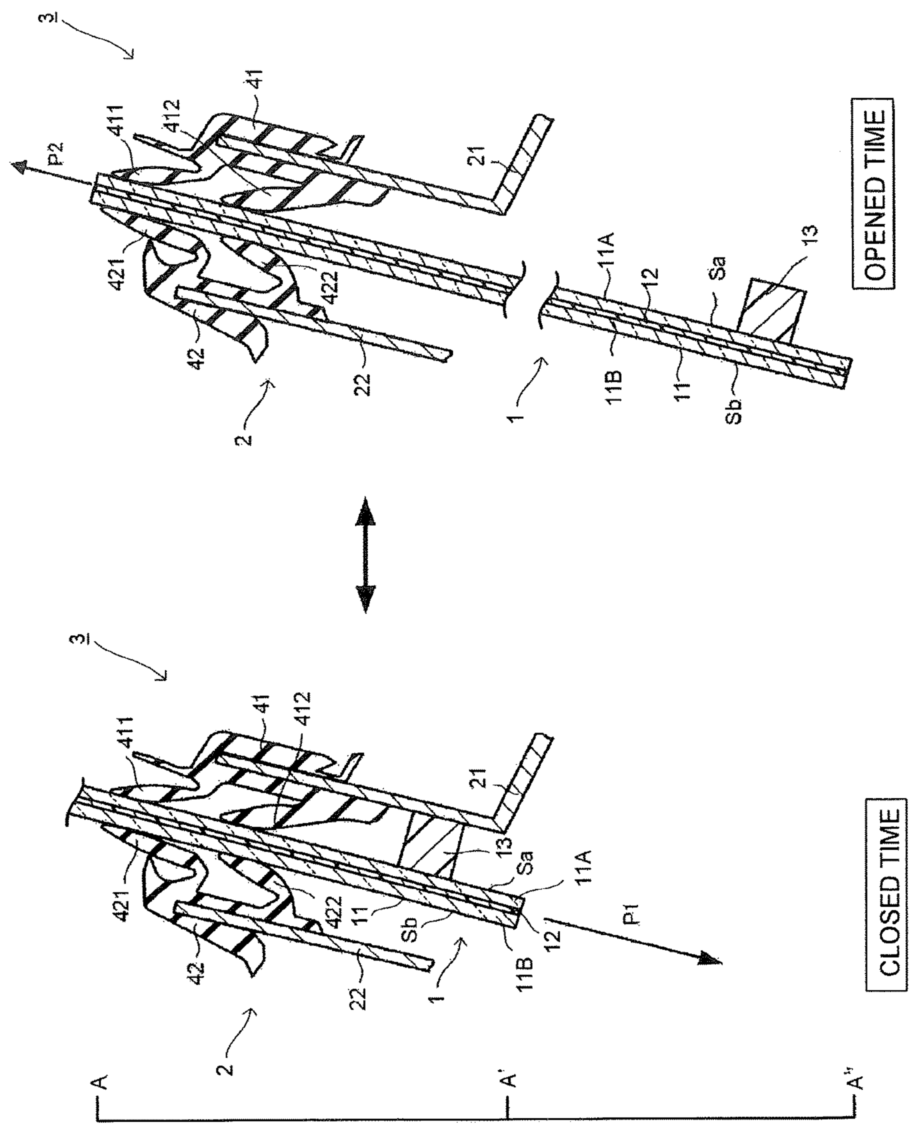
FIG. 3 is a cross-sectional view taken along the A-A'-A" line in FIG. 2 that schematically illustrates a state at a closed time and a state at an opened time when the laminated glass according to the embodiment in FIG. 1 is used in the automobile door illustrated in FIG. 2.

FIG. 1 is a cross-sectional view of a laminated glass according to the embodiment, and FIG. 2 is a side view of an automobile in which an automobile door including the laminated glass according to the embodiment is installed. FIG. 3 is a cross-sectional view taken along the A-A'-A" line in FIG. 2 that schematically illustrates a state at a closed time and a state at an opened time when the laminated glass according to the embodiment in FIG. 1 is used in the automobile door illustrated in FIG. 2.

A laminated glass 1 illustrated in FIG. 1 is a laminated glass for an automobile door. The laminated glass 1 includes a laminated glass main body 11 composed of two glass plates 11A, 11B and an interlayer film 12 held sandwiched between the glass plates, and a viscoelastic member 13 provided at a position, on a surface Sa on the glass plate 11A side of the laminated glass main body 11, to be a lower portion when the laminated glass 1 is used as a composing member of an automobile door. The viscoelastic member 13, as will be explained below, abuts on a seal member or a panel board that an automobile door panel has, and seals a gap between the seal member or the panel board and the laminated glass main body 11 at a closed time of the laminated glass 1.

In the laminated glass 1, the interlayer film 12 has a three-layer laminated structure in which two skin layers 12A, 12B hold a core layer 12C sandwiched therebetween, and has a storage modulus G' of $1.5\times10^6$ Pa or more, which is measured by a dynamic viscoelasticity test under a condition at a frequency of 1 Hz, a dynamic shearing strain of 0.015%, and a temperature of 20° C. As long as the storage modulus G of the interlayer film is $1.5\times10^6$ Pa or more, the interlayer film is allowed to have a high rigidity and the glass plates composing the laminated glass together can be reduced in thickness, resulting in a weight reduction of the laminated glass. However, the sound insulating performance in such laminated glass deteriorates at a specific frequency, concretely around 2000 to 5000 Hz as described above. The laminated glass 1 according to the embodiment is one in which the viscoelastic member 13 is provided on the laminated glass main body 11 so as to form a later-described sound insulating structure, to thereby suppress the above-described deterioration of sound insulating performance.

In this specification, the "storage modulus G'" is a storage modulus G' measured by a dynamic viscoelasticity test under the condition at a frequency of 1 Hz, a dynamic shearing strain of 0.015%, and a temperature of 20° C. unless otherwise noted. The storage modulus G' can be measured by a shearing method, for example, by a dynamic viscoelasticity test using a Rheometer MCR301 manufactured by Anton Paar GmbH. Although the interlayer film 12 has a three-layer laminated structure in the laminated glass 1, the number of layers is not limited as long as the storage modulus G' is $1.5\times10^6$ Pa or more. The interlayer film 12 may be a single-layer film, or may also be a laminated film in which a plurality of layers are laminated. When the interlayer film is a laminated film composed of a plurality of layers, the number of layers is preferably two to five, and from the viewpoint of easily achieving the above-described two properties in a balanced manner, three layers are particularly preferred.

The laminated glass 1 composes a part of an automobile door 3 included in an automobile 10 illustrated in FIG. 2, for example. The automobile door 3 is composed of an automobile door panel (to be also referred to as a "door panel" simply, hereinafter) 2 and the laminated glass 1. The door panel 2 includes two panel boards facing each other (in FIG. 2, only a panel board 22 on an automobile exterior side is illustrated) and seal members provided on facing surfaces of the panel boards at regions along a beltline L (to be also referred to as "beltline portions" hereinafter) Ls. The laminated glass 1 is provided in a liftable manner between the two panel boards 21 and 22 of the door panel 2 so as to slide between seal members 41 and 42 (FIG. 3). In the automobile 10, the beltline L is a line connecting upper ends of the panel boards 22 of the front and rear automobile doors 3. The beltline portion Ls is a region having a predetermined width from the upper ends of the panel boards toward a downside along the beltline L.

The laminated glass 1 is provided in the door panel 2 in a liftable manner, to thereby be openable and closable. The laminated glass 1 being openable and closable means that a window opening portion W located at an upside of the automobile door 3 illustrated in FIG. 2 is free to be opened and closed by the laminated glass 1 being raised and lowered. That is, at a closed time of the laminated glass 1, the window opening portion W is closed by the laminated glass 1, and at an opened time of the laminated glass 1, the window opening portion W is in a state of being opened.

FIG. 3 is a view schematically illustrating a cross-sectional view taken along the A-A'-A" line of the automobile door 3 including the laminated glass 1 in FIG. 2 at a closed time and at an opened time of the laminated glass 1. FIG. 3 illustrates the two panel boards 21 and 22 facing each other and the seal members 41 and 42 provided on the facing surfaces of the panel boards 21 and 22, at the beltline portions Ls which are included in the door panel 2. The laminated glass 1 is installed in the door panel 2 so that the surface Sa on the glass plate 11A side of the laminated glass main body 11 is located on the automobile interior side and a surface Sb on the glass plate 11B side is located on the automobile exterior side. The laminated glass 1 at a closed time is lowered in an arrow P1 direction, and a state where it is lowered completely is an opened time. Further, the laminated glass 1 at an opened time is raised in an arrow P2 direction, and a state where it is raised completely is a closed time.

In this specification, out of the two panel boards, the panel board located on the automobile interior side is referred to as an inner panel and the panel board located on the automobile exterior side is referred to as an outer panel. Similarly, out of the two seal members, the seal member located on the automobile interior side is referred to as an inner seal member and the seal member located on the automobile exterior side is referred to as an outer seal member. In the door panel 2 illustrated in FIG. 3, the inner seal member 41 has two lip portions vertically on the laminated glass 1 side, that is, an upper inner lip 411 and a lower inner lip 412, while the outer seal member 42 has an upper outer lip 421 and a lower outer lip 422 on the laminated glass 1 side similarly.

In the automobile door 3 illustrated in FIG. 3, at a closed time of the laminated glass 1, a gap between the inner panel 21 and the laminated glass main body 11 is sealed by the viscoelastic member 13. This makes it possible to sufficiently suppress the amount of sound to enter the automobile interior through the beltline portion at a closed time of the laminated glass 1.

Here, in the automobile door 3 illustrated in FIG. 3, the viscoelastic member 13 that the laminated glass 1 has is constrained between the laminated glass main body 11 and the inner panel 21 to thereby form a constraining type vibration suppressing structure. Therefore, it is possible to sufficiently suppress vibrations of the laminated glass 1 and achieve a high sound insulating effect in the automobile interior at a closed time of the laminated glass 1. Incidentally, as a cause of vibration of the laminated glass, there can be cited propagation of road noise from the door panel to the laminated glass, propagation of engine noise, and so on.

Hereinafter, there will be explained respective members that the laminated glass according to the embodiment has by taking the laminated glass 1 illustrated in FIG. 1 and FIG. 3 as an example.

[Laminated Glass Main Body]

The laminated glass main body 11 has the pair of glass plates 11A and 11B facing each other and the interlayer film 12 arranged so as to be held sandwiched between the pair of glass plates 11A and 11B. The interlayer film 12 is composed of three layers: the pair of skin layers 12A and 12B; and the core layer 12C arranged so as to be held sandwiched between the skin layers 12A and 12B. In the laminated glass main body 11, the interlayer film 12 is arranged so that the skin layer 12A is located on the glass plate 11A side and the skin layer 12B is located on the glass plate 11B side. In the laminated glass main body 11, the pair of glass plates 11A and 11B and the three layers 12A, 12B, and 12C composing the interlayer film have main surfaces with substantially the same shape and same dimensions.

Here, in this specification, "substantially the same shape and same dimensions" means having the same shape and same dimensions visually. Also in other cases, "substantially" is to be understood similarly to the above. The shape and the size of the main surface of the laminated glass main body 11 are the shape and the size that allow the viscoelastic member 13 to seal the gap between the inner panel 21 and the laminated glass main body 11 at the downside in the beltline portion in a state of the window opening portion of the automobile door being closed at a closed time of the laminated glass.

(Glass Plate)

Each thickness of the pair of glass plates 11A and 11B in the laminated glass main body 11 preferably falls within a range of 0.3 mm to 1.8 mm. By each of the thicknesses of the glass plates 11A and 11B being 0.3 mm or more, a rigidity when the glass plates 11A and 11B are combined with the following interlayer film to fabricate the laminated glass is secured easily. By each of the thicknesses of the glass plates 11A and 11B being 1.8 mm or less, the weight reduction when the glass plates 11A and 11B are combined with the interlayer film to fabricate the laminated glass is achieved easily. Each of the thicknesses of the glass plates 11A and 11B preferably falls within a range of 1.0 mm to 1.8 mm, and more preferably falls within a range of 1.5 mm to 1.8 mm.

The thicknesses of the pair of glass plates 11A and 11B may be the same with or different from each other. In the case where the thicknesses of the pair of glass plates 11A and 11B are different, the thickness of the glass plate located on the automobile interior side when the laminated glass 1 is installed in the door panel 2 is preferred to be smaller than the thickness of the glass plate located on the automobile exterior side.

When the laminated glass 1 is installed in the door panel 2 as illustrated in FIG. 3, for example, the glass plate located on the automobile interior side is the glass plate 11A. In this case, the thickness of the glass plate 11A on the automobile interior side is preferably 0.3 mm to 1.8 mm, more preferably 1.0 mm to 1.8 mm, and still more preferably 1.5 mm to 1.8 mm. Further, the thickness of the glass plate 11A is preferred to be smaller than the thickness of the glass plate 11B on the automobile exterior side. The difference in thickness between the glass plate 11A and the glass plate 11B is preferably 0.0 to 1.5 mm, and more preferably 0.0 to 1.3 mm. In this case, the thickness of the glass plate 11B located on the automobile exterior side is preferably 0.3 mm to 1.8 mm, more preferably 1.0 mm to 1.8 mm, and still more preferably 1.5 mm to 1.8 mm.

In use of the laminated glass, the glass plate located on the automobile exterior side having a thickness larger than that of the glass plate located on the automobile interior side is preferred for better durability against a flying stone.

The thicknesses of the pair of glass plates 11A and 11B in the laminated glass main body 11 are preferred to be 3.3 mm or less in total, and more preferred to be 3.0 mm or less in total from the viewpoint of weight reduction.

Examples of the material of the glass plates 11A and 11B used for the laminated glass main body 11 include transparent inorganic glass and organic glass (resin). As the inorganic glass, ordinary soda lime glass (to be also referred to as soda lime silicate glass), aluminosilicate glass, borosilicate glass, non-alkali glass, quartz glass, and so on are used without any particular limitation. Among them, the soda lime glass is particularly preferred. Its forming method is also not particularly limited and, for example, float plate glass formed by a float method or the like may be used. Further, the glass plates 11A and 11B have been subjected to strengthening such as thermally tempering or chemical strengthening preferably.

As the above-described glass, a colorless and transparent material with no coloring component added thereto may be used, or a colored and transparent material colored within the range not impairing the effect of the present invention may be used.

The pair of glass plates 11A and 11B used for the laminated glass main body 11 may be formed of different kinds of materials from each other, and are preferably formed of the same kind of material. The shape of the glass plates 11A and 11B may be flat or may entirely or partially have a curvature. The glass plates 11A and 11B may have a coating that imparts a water repellent function, a hydrophilic function, an antifogging function, and the like to an exposed surface exposed to the atmosphere. Further, the facing surfaces facing each other of the glass plates 11A and 11B may have a functional coating normally including a metal layer such as a low emissivity coating, an infrared cut coating, a conductive coating, and the like.

Incidentally, in the case where the facing surfaces of the glass plates 11A and 11B have the above-described functional coatings, the following skin layers 12A and 12B of the interlayer film 12 are structured to be in contact with the functional coatings on the facing surfaces of the glass plates 11A and 11B.

(Interlayer Film)

The interlayer film 12 in the laminated glass main body 11 is composed of three layers: the pair of skin layers 12A and 12B; and the core layer 12C arranged so as to be held sandwiched between the skin layers 12A and 12B. The interlayer film 12 is arranged between the glass plates 11A and 11B and has a function of bonding the glass plates 11A and 11B together to integrate them as the laminated glass main body 11.

The interlayer film 12 has the storage modulus G' of $1.5\times10^6$ Pa or more. The storage modulus G' is an index indicating rigidity of the interlayer film 12, and as long as the storage modulus G' of the interlayer film 12 is $1.5\times10^6$ Pa or more, a sufficiently high rigidity can be secured even though the interlayer film 12 is combined with the glass plates 11A and 11B having the above-described thicknesses to fabricate the laminated glass main body 11. The storage modulus G' of the interlayer film 12 is preferably $2.0\times10^6$ Pa or more, more preferably $3.0\times10^6$ Pa or more, and still more preferably $4.0\times10^6$ Pa or more.

The upper limit of the storage modulus G' of the interlayer film 12 is not limited in particular. However, an increase in the storage modulus G' of the interlayer film 12 sometimes makes the interlayer film 12 impossible to have predetermined sound insulating performance to be explained below together when the interlayer film 12 is combined with the pair of glass plates 11A and 11B having the above-described thicknesses to fabricate the laminated glass main body 11. Further, when the storage modulus G' of the interlayer film 12 is too high, productivity sometimes decreases due to a reason such that a special apparatus is required when working such as cutting. Furthermore, the interlayer film becomes brittle to cause a decrease in penetration resistance. Considering such points, the storage modulus G' of the interlayer film 12 is preferably $1.3\times10^8$ or less.

Furthermore, the interlayer film 12 is preferred to be an interlayer film having sound insulating performance allowing a loss factor at one or more resonance points to be 0.2 or more under a condition at a frequency of 3 to 6 KHz and a temperature of 20° C. when being combined with the pair of glass plates 11A and 11B having the above-described thicknesses to fabricate the laminated glass main body 11. The sound insulating performance of the interlayer film more preferably allows the loss factor to be 0.25 or more under the above-described conditions, and still more preferably allows the loss factor to be 0.3 or more.

The upper limit of the loss factor under the above-described conditions that indicates the sound insulating performance of the interlayer film is not limited in particular. However, an increase in the sound insulating performance of the interlayer film 12 sometimes makes it impossible to satisfy the predetermined storage modulus G' explained above. Considering this point, the loss factor under the above-described conditions that indicates the sound insulating performance of the interlayer film 12 is preferably 0.6 or less at the maximum.

Incidentally, the sound insulating performance of the interlayer film in this specification is evaluated based on a value obtained in a manner that an interlayer film to be evaluated is combined with a pair of glass plates having the above-described thicknesses to fabricate laminated glass and a loss factor under the condition at a frequency of 3 to 6 KHz and a temperature of 20° C. is measured by, for example, central exciting method measurement systems (MA-5500, DS-2000) manufactured by ONO SOKKI Co., Ltd.

The interlayer film 12 in the laminated glass main body 11 satisfies the predetermined storage modulus G' and preferably satisfies the predetermined sound insulating performance in the interlayer film of the laminated glass according to the present invention, as the interlayer film 12 that is composed of three layers: the core layer 12C; and the pair of skin layers 12A and 12B holding the core layer 12C sandwiched therebetween to be integrated.

Although properties of the three layers composing the interlayer film 12 having the above-described performance are not limited in particular as long as the above-described performance can be secured as the interlayer film 12, a storage modulus G' of the core layer 12C is preferred to be smaller than each of storage moduli G of the pair of skin layers 12A and 12B. For example, the storage modulus G' of the core layer 12C is preferably $1.0\times10^4$ Pa or more and $1.0\times10^7$ Pa or less, and more preferably $1.0\times10^5$ Pa or more and $5.0\times10^6$ Pa or less.

Each of the storage moduli G' of the skin layers 12A and 12B is preferably $5.0\times10^6$ Pa or more and $1.3\times10^8$ Pa or less, and more preferably $1.0\times10^7$ Pa or more and $1.3\times10^8$ Pa or less after securing the condition that they are larger than the storage modulus G' of the core layer 12C. The storage moduli G' of the pair of skin layers 12A and 12B may be the same or different as long as they are larger than the storage modulus G' of the core layer 12C. From the viewpoint of ease of resin molding, they are preferred to be the same.

Incidentally, as the relationship between the storage modulus G' of the core layer 12C and the storage moduli G's of the skin layers 12A and 12B, each ratio of the storage moduli G's of the skin layers 12A and 12B to the storage modulus G' of the core layer 12C is preferably a value of 10 to 10000, and more preferably a value of 100 to 3000. The storage modulus G' of the core layer 12C and the storage moduli G's of the skin layers 12A and 12B are made to satisfy the above-described relationship, thereby making it easier to adjust each of the storage modulus G' and the sound insulating performance in the interlayer film 12 to fall within the above-described predetermined range.

The sound insulating performance in the interlayer film 12 is adjusted by the storage modulus G' and the thickness of each of the skin layers 12A, 12B and the core layer 12C. The thickness of the interlayer film 12 is preferably 0.1 to 1.6 mm and more preferably 0.5 to 1.2 mm, similarly to an interlayer film to be normally used for laminated glass or the like. When the thickness of the interlayer film 12 is less than 0.1 mm, strength sometimes becomes insufficient, and when there is a large glass mismatch, peeling becomes likely to occur. When the thickness of the interlayer film 12 exceeds 1.6 mm, a phenomenon in which displacement of the pair of glass plates 11A and 11B between which the interlayer film 12 is held sandwiched occurs in a later-described compression bonding process when fabricating the laminated glass main body 11 and in an durability test (outdoor exposure test and high-temperature test), what is called a plate displacement phenomenon sometimes occurs.

The thickness of the core layer 12C is preferably 0.05 to 0.30 mm, and more preferably 0.07 to 0.27 mm depending on the storage modulus G' of the core layer 12C and the thicknesses and the storage moduli G's of the skin layers 12A and 12B to be combined therewith. Further, the thicknesses of the skin layers 12A and 12B are each preferably 0.1 to 0.7 mm and more preferably 0.2 to 0.5 mm depending on the storage moduli G's of the skin layers 12A and 12B and the thickness and the storage modulus G' of the core layer 12C to be combined therewith.

As for the relationship between the thickness of the core layer 12C and the thicknesses of the skin layers 12A and 12B, the total thickness of the three layers preferably falls within a range that is preferred as the thickness of the above-described interlayer film 12. Further, the thickness of the core layer 12C is preferred to be smaller than the thicknesses of the skin layers 12A and 12B. Each of the thicknesses of the skin layers 12A and 12B preferably falls within a range that is one to five times as large as the thickness of the core layer 12C.

The thicknesses of the skin layers 12A and 12B may be the same or different. For example, when in the laminated glass main body 11, the glass plate located on the automobile interior side is the glass plate 11A, the skin layer 12A becomes a skin layer located on the interior side. In this case, the thickness of the skin layer 12A on the interior side may be smaller than the thickness of the skin layer 12B on the exterior side, and the thickness of the skin layer 12A preferably falls within a range that is 0.3 to 1.0 time as large as the thickness of the skin layer 12B.

The core layer 12C and the skin layers 12A, 12B are formed of a resin appropriately selected from thermoplastic resins being a main material forming the interlayer film normally used for a laminated glass, for each layer so as to obtain the above-described preferred storage modulus G'. The kind of the thermoplastic resin to be used is not particularly limited as long as it can be adjusted to have the above-described preferred storage modulus G'.

Concrete examples of such a thermoplastic resin include thermoplastic resins such as a polyvinyl acetal resin such as a polyvinyl butyral resin (PVB), a polyvinyl chloride resin (PVC), a saturated polyester resin, a polyurethane resin, an ethylene-vinyl acetate copolymer resin (EVA), an ethylene-ethyl acrylate copolymer resin, and a cycloolefin polymer (COP). These thermoplastic resins can be adjusted to have the above-described preferred storage modulus G' by adjusting the amount of a plasticizer or the like, for example. These thermoplastic resins may be used independently, or two or more kinds of them may be used in combination.

Further, the thermoplastic resins are selected according to use of the laminated glass and in consideration of balance among various performances such as transparency, weather resistance, adhesive strength, penetration resistance, impact energy absorbency, moisture resistance, and heat insulating property in addition to the conditions of the storage modulus G'. From such a viewpoint, PVB, EVA, a polyurethane resin, and the like are preferred as the thermoplastic resin forming the core layer 12C. Further, PVB, EVA, a polyurethane resin, and the like are preferred for each of the skin layers 12A and 12B.

For fabrication of the core layer 12C and the skin layers 12A, 12B, a thermoplastic resin-containing composition containing, as a main component, such a thermoplastic resin is used. The thermoplastic resin-containing composition may contain one kind or two or more kinds of various additives such as, for example, an infrared absorbent, an ultraviolet absorbent, a fluorescer, an adhesion regulator, a coupling agent, a surfactant, an antioxidant, a heat stabilizer, a light stabilizer, a dehydrating agent, a defoaming agent, an antistatic agent, and a flame retarder within the range not impairing the effect of the present invention and according to various purposes. These additives are entirely uniformly contained in the core layer 12C and the skin layers 12A, 12B.

Incidentally, regarding the additives contained for imparting additional functions to the core layer 12C and the skin layers 12A, 12B, such as the infrared absorbent, the ultraviolet absorbent, and the fluorescer, in particular, among the above-described additives, only one layer or two or more layers in the three layers may contain the additives. Further, when two or more layers contain the additives, the two or more layers may contain the same kind of additive in the same amount or in different amounts, and may contain different additives respectively.

The interlayer film 12 is fabricated in a manner that the thermoplastic resin-containing compositions suitable for the core layer 12C and the skin layers 12A, 12B respectively are formed into sheet shapes to prepare the core layer 12C and the skin layers 12A, 12B, and the core layer 12C is held sandwiched between the obtained skin layers 12A and 12B to be heated under pressure, for example. The heating and pressuring conditions are appropriately selected depending on the kind of the thermoplastic resin.

(Laminated Glass Main Body)

The laminated glass main body 11 has the pair of glass plates 11A and 11B having the above-described predetermined thicknesses, and the interlayer film 12 having the above-described properties that is arranged so as to be held sandwiched between them. This means that the laminated glass main body 11 is laminated glass that is light in weight and has both a rigidity and a sound insulating property.

The laminated glass main body preferably has a loss factor at one or more resonance points under the condition at a frequency of 3 to 6 KHz and a temperature of 20° C. of 0.2 or more as described above. This property of the laminated glass main body is due largely to the sound insulating performance of the interlayer film as described above. Having this property allows the laminated glass main body to have a sufficient sound insulating property even though the pair of glass plates has the above-described thicknesses.

The loss factor of the laminated glass main body at the resonance point at a temperature of 20° C. and in a frequency range of 3 to 6 KHz can be measured by the same method as that described for the sound insulating performance of the above-described interlayer film, for example. Incidentally, in the laminated glass main body, the loss factor at one or more resonance points under the condition at a frequency of 3 to 6 KHz and a temperature of 20° C. is preferably 0.25 or more, and more preferably 0.3 or more. Further, the loss factor of the laminated glass main body at the resonance point that is measured under the condition at a frequency of 3 to 6 KHz and a temperature of 20° C. is preferably 0.6 or less at the maximum.

Further, the laminated glass main body preferably has a three point bend rigidity of 100 N/mm or more. The three point bend rigidity is a rigidity obtained by a three point bend test, and can be measured by a compression and tensile testing machine, for example. The three point bend rigidity is particularly preferably 120 N/mm or more. The three point bend rigidity of the laminated glass main body being 100 N/mm or more is preferred because it is the rigidity at a level not inhibiting opening and closing of the window glass during high-speed running of an automobile.

The laminated glass main body preferably has a sound transmission loss in a coincidence region, which is measured in conformity with SAE 11400, of 25 dB or more and particularly preferably 30 dB or more. The laminated glass having a sound transmission loss of 25 dB or more can be evaluated to be excellent in sound insulating property.

(Another Layer)

The laminated glass main body may have, as another layer, a functional film between the pair of glass plates within the range not impairing the effect of the present invention. When having a functional film, for example, the laminated glass main body is preferably composed so that the interlayer film is composed of a plurality of layers and the functional film is held sandwiched between the plurality of layers.

As another layer, the laminated glass main body may have, for example, a black ceramic layer arranged in a band shape at a part or all of a peripheral edge portion thereof for the purpose of hiding a portion attached to a frame body or the like of the laminated glass main body, a wiring conductor, and the like.

(Manufacture of Laminated Glass Main Body)

The laminated glass main body can be manufactured by a generally used publicly-known technique. In the laminated glass main body 11, the interlayer film 12 is fabricated by holding the core layer 12C sandwiched between the skin layers 12A and 12B as above, and the interlayer film 12 is inserted in between the pair of glass plates 11A and 11B to prepare a laminated glass precursor being a laminated glass main body before compression bonding in which the glass plate 11A, the interlayer film 12 (the skin layer 12A/the core layer 12C/the skin layer 12B), and the glass plate 11B are laminated in this order. Also in the case of having another layer, the glass plates and the layers are laminated in the same lamination order as that of a laminated glass main body obtained in the same manner to prepare a laminated glass precursor.

The laminated glass precursor is put in a vacuum bag such as a rubber bag, the vacuum bag is connected to an exhaust system, and bonding of them is performed at a temperature of about 70 to 110° C. while pressure-reduction suction (deaeration) is being performed so that a pressure in the vacuum bag becomes a pressure reduction degree of about −60 to −100 kPa, and thereby the laminated glass main body can be obtained. Further, for example, the laminated glass main body is subjected to compression bonding that heats and pressurizes it under a condition at 100 to 140° C. and a pressure of 0.6 to 1.3 MPa, and thereby a laminated glass main body superior in durability can be obtained.

Incidentally, the laminated glass main body preferably has a visible light transmittance measured according to JIS R3212 (1998) of 70% or more, and more preferably 74% or more. The laminated glass main body preferably has a Tts (Total solar energy transmitted through a glazing) measured according to ISO13837-2008 of 66% or less, and more preferably 60% or less.

[Viscoelastic Member]

In the laminated glass 1 illustrated in FIG. 1 and FIG. 3, the viscoelastic member 13 is provided at a position on the surface Sa of the glass plate 11A side of the laminated glass main body 11, where the viscoelastic member 13 can seal the gap between the laminated glass main body 11 and the inner panel 21 by abutting on the inner panel 21 at a closed time of the laminated glass 1 (to be also referred to as a "closed time" simply hereinafter). The shape of the viscoelastic member 13 is not limited in particular as long as it is a shape that allows sealing of the gap between the laminated glass main body 11 and the inner panel 21, namely a shape that allows the viscoelastic member 13 to be constrained between the laminated glass main body 11 and the inner panel 21 at a closed time.

Incidentally, the viscoelastic member 13 preferably has a cross-sectional shape, which is cut along the vertical direction of the laminated glass, being a tapered shape tapering toward an upper end thereof, namely tapering in the traveling direction (P2 direction) of the laminated glass 1 when the laminated glass 1 is closed. Such a shape makes it easier for the viscoelastic member 13 to enter the gap between the laminated glass main body 11 and the inner panel 21 and seal the gap between the laminated glass main body 11 and the inner panel 21 when the laminated glass 1 is closed from an opened time of the laminated glass 1.

Figure 4:
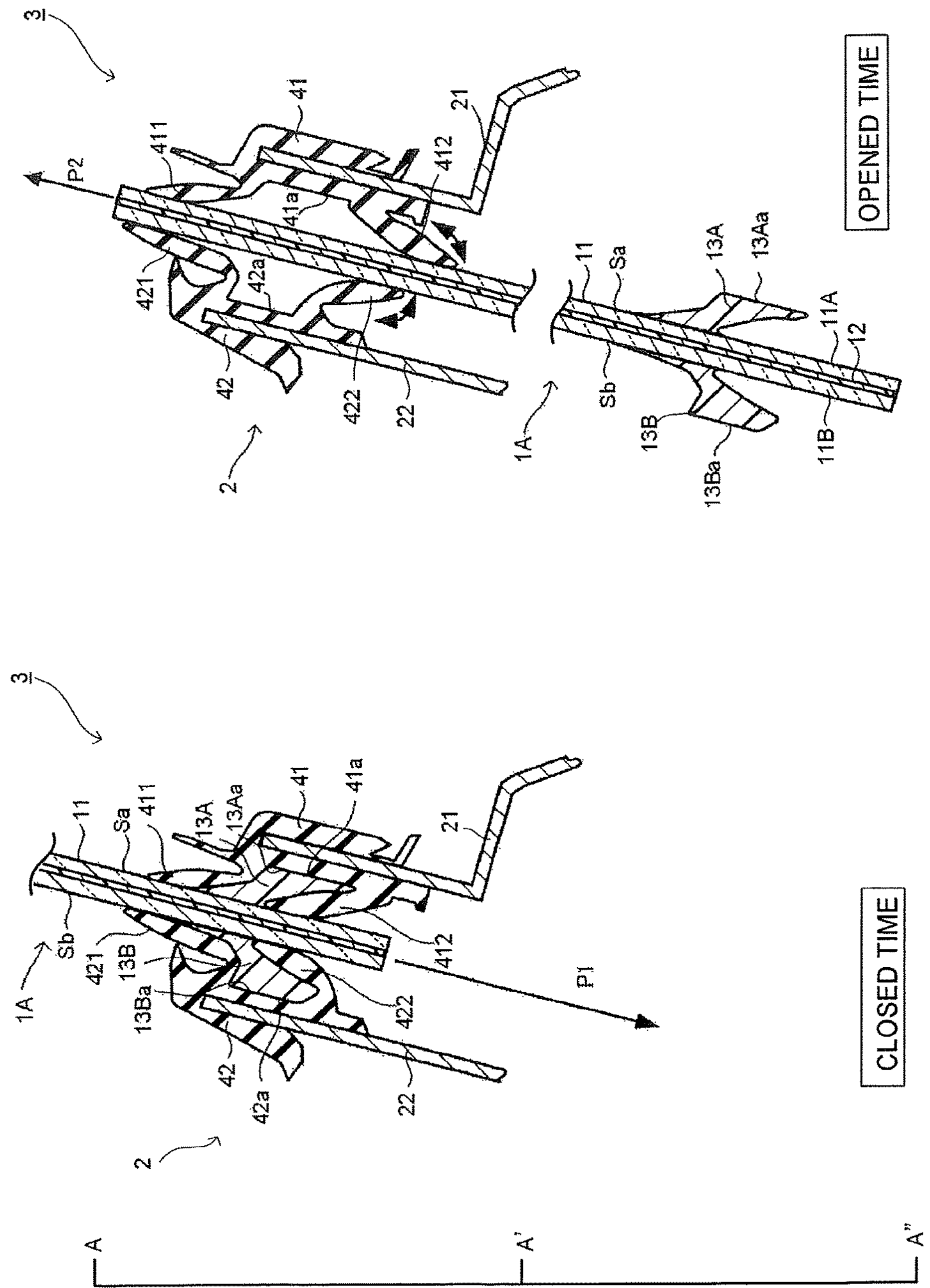
FIG. 4 is a cross-sectional view taken along the A-A'-A" line in FIG. 2 that schematically illustrates a state at a closed time and a state at an opened time when a laminated glass according to another embodiment is used in the automobile door illustrated in FIG. 2.
Figure 5:
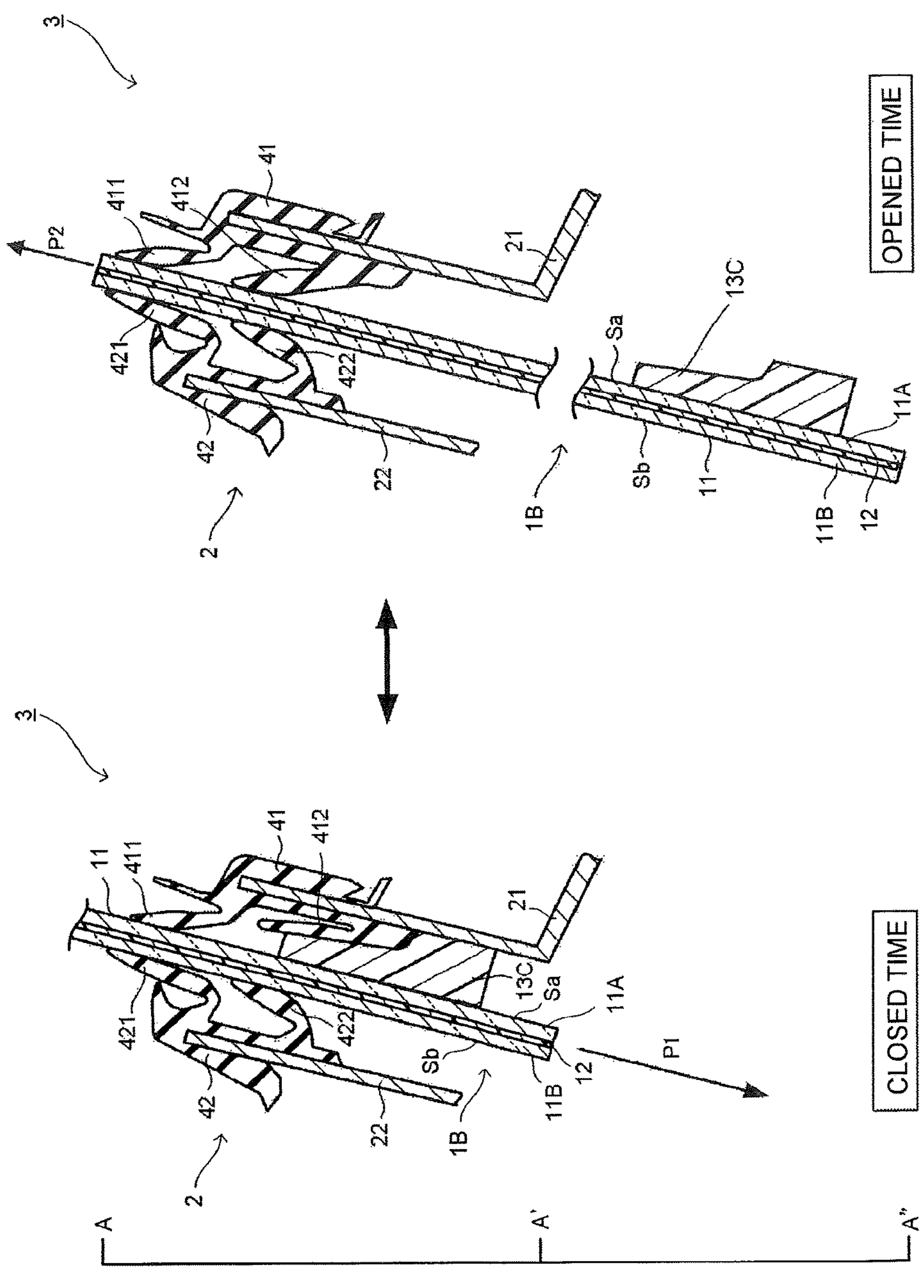
FIG. 5 is a cross-sectional view taken along the A-A'-A" line in FIG. 2 that schematically illustrates a state at a closed time and a state at an opened time when a laminated glass according to yet another embodiment is used in the automobile door illustrated in FIG. 2.

Here, the viscoelastic member that the laminated glass has may be a member that abuts on the seal member at a closed time to seal a gap between the laminated glass main body and the seal member as illustrated in FIG. 4, for example. Further, the viscoelastic member that the laminated glass has may also be a member that abuts on both the seal member and the panel board at a closed time to seal a gap between the laminated glass main body and the seal member and the panel board as illustrated in FIG. 5, for example.

Further, in the laminated glass 1 illustrated in FIG. 1 and FIG. 3, the viscoelastic member 13 is provided only on the surface Sa of the glass plate 11A side (automobile interior side) of the laminated glass main body 11 to have a shape that allows sealing of the gap between the laminated glass main body 11 and the inner panel 21 at a closed time, and further additionally, the viscoelastic member 13 may be provided also on the surface Sb of the glass plate 11B side (automobile exterior side) of the laminated glass main body 11 to have a shape that allows sealing of a gap between the laminated glass main body 11 and the outer panel 22 at a closed time. Further, a structure in which the viscoelastic member 13 is provided only on the automobile exterior-side surface Sb of the laminated glass main body 11 may also be applied. From the viewpoint of an improvement in sound insulating performance, the laminated glass 1 having the viscoelastic member 13 at least on the automobile interior-side surface Sa of the laminated glass main body 11 is preferred.

Similarly, also in the case where the viscoelastic member that the laminated glass has is the member that abuts on the seal member at a closed time to seal the gap between the laminated glass main body and the seal member and is the member that abuts on both the seal member and the panel board at a closed time to seal the gap between the laminated glass main body and the seal member and the panel board, the viscoelastic member may be provided on either one or both of the automobile interior-side surface and the automobile exterior-side surface of the laminated glass main body, and the laminated glass having the viscoelastic member at least on the automobile interior-side surface of the laminated glass main body is preferred.

FIG. 4 is a view schematically illustrating a cross-sectional view taken along the A-A'-A" line in FIG. 2 of an automobile door 3 including laminated glass 1A at a closed time and at an opened time of the laminated glass 1A. A door panel 2 in FIG. 4 has the same composition as that of the door panel 2 illustrated in FIG. 3 except that at an opened time of the laminated glass 1A (to be also referred to as an "opened time" simply hereinafter), the lower inner lip 412 of the inner seal member 41 and the lower outer lip 422 of the outer seal member 42 each have a tip portion heading downward. The laminated glass 1A is installed in the door panel 2 so that in a laminated glass main body 11, a surface Sa on a glass plate 11A side is located on the automobile interior side and a surface Sb on a glass plate 11B side is located on the automobile exterior side.

The laminated glass 1A illustrated in FIG. 4 has the same laminated glass main body 11 as that of the laminated glass 1 illustrated in FIG. 1 and FIG. 3. The entire cross-sectional view of the laminated glass 1A is illustrated in the drawing at an opened time in FIG. 4. The laminated glass 1A includes the laminated glass main body 11, a viscoelastic member 13A provided in a lower portion on the automobile interior-side surface Sa, and a viscoelastic member 13B provided in a lower portion on the automobile exterior-side surface Sb.

In FIG. 4, the laminated glass 1A at a closed time is lowered in an arrow P1 direction, and a state where it is lowered completely is an opened time. The laminated glass 1A at an opened time is raised in an arrow P2 direction, and a state where it is raised completely is a closed time. When the laminated glass 1A is closed, namely, the laminated glass 1A is raised in the P2 direction, the tip portion of the lower inner lip 412 and the tip portion of the lower outer lip 422 are each turned to the up arrow direction illustrated near the member as, for example, the viscoelastic member 13A is inserted into a gap between the two lips of the inner seal member 41 and the viscoelastic member 13B is inserted into a gap between the two lips of the outer seal member 42 respectively, and the laminated glass 1A is brought into a closed-time state finally. The viscoelastic member 13A that the laminated glass 1A has is provided at a predetermined position in the lower portion on the automobile interior-side surface Sa of the laminated glass main body 11 so as to be located between the upper inner lip 411 and the lower inner lip 412 at a closed time, and the viscoelastic member 13B that the laminated glass 1A has is provided at a predetermined position in the lower portion on the automobile exterior-side surface Sb of the laminated glass main body 11 so as to be located between the upper outer lip 421 and the lower outer lip 422 at a closed time respectively.

At a closed time of the laminated glass 1A illustrated in FIG. 4, the viscoelastic member 13A that the laminated glass 1A has is located between the upper inner lip 411 and the lower inner lip 412 of the inner seal member 41, and further an outer peripheral surface of the viscoelastic member 13A is in contact with substantially the entire surface of an inner peripheral surface of the inner seal member 41, which is on the laminated glass 1A side. Further, similarly, the viscoelastic member 13B that the laminated glass 1A has is located between the upper outer lip 421 and the lower outer lip 422 of the outer seal member 42, and further an outer peripheral surface of the viscoelastic member 13B is in a contact with substantially the entire surface of an inner peripheral surface of the outer seal member 42, which is on the laminated glass 1A side. In this specification, "substantially the entire surface" means having an area that is 90% or more relative to the entire area of a predetermined surface. Although the structure illustrated in FIG. 4 is explained below, a structure in which the viscoelastic member 13A abuts only on the lower inner lip 412 may be applied, or a structure in which in addition to the above, the viscoelastic member 13B also abuts only on the lower outer lip 422 may also be applied.

As illustrated in FIG. 4, at a closed time of the laminated glass 1A, the viscoelastic member 13A is in contact with the inner seal member 41 with no gap therebetween, and further the viscoelastic member 13B is in contact with the outer seal member 42 with no gap therebetween, thereby sealing the gap between the laminated glass main body 11 and the door panel 2. Therefore, the automobile door 3 enables sufficient suppression of the amount of sound to enter the automobile interior through the beltline portion at a closed time of the laminated glass.

When the viscoelastic member that the laminated glass has abuts on the seal member at a closed time to seal the gap between the laminated glass main body and the seal member as above, the viscoelastic member preferably has a Young's modulus lower than that of the seal member on which the viscoelastic member abuts. In the laminated glass 1A illustrated in FIG. 4, the viscoelastic member 13A preferably has a Young's modulus lower than that of the inner seal member 41, and the viscoelastic member 13B preferably has a Young's modulus lower than that of the outer seal member 42.

When the Young's modulus is lower than that of the seal member on which the viscoelastic member abuts, in the automobile door 3 illustrated in FIG. 4, the viscoelastic member 13A that the laminated glass 1A has is constrained by the laminated glass main body 11 and the inner seal member 41 and the inner panel 21, thereby enabling formation of a constraining type vibration suppressing structure, and further the viscoelastic member 13B is constrained by the laminated glass main body 11 and the outer seal member 42 and the outer panel 22, thereby enabling formation of a constraining type vibration suppressing structure. This makes it possible to sufficiently suppress vibrations of the laminated glass 1A and achieve a high sound insulating effect in the automobile interior at a closed time of the laminated glass 1A.

Incidentally, the shape of the outer peripheral surface of the viscoelastic member 13A depends on the shape of the inner peripheral surface of the inner seal member 41, which is on the laminated glass 1A side. At a closed time illustrated in FIG. 4, the outer peripheral surface of the viscoelastic member 13A has a shape that comes into contact with substantially the entire surface of the inner peripheral surface of the inner seal member 41, which is on the laminated glass 1A side. However, in the automobile door 3, the outer peripheral surface of the viscoelastic member 13A does not necessarily need to come into contact with the entire surface of the inner peripheral surface of the inner seal member 41, which is on the laminated glass 1A side, and the viscoelastic member 13A only needs to be located between the two inner lips at a closed time and abut on at least a part of the inner seal member 41. This structure makes it possible to obtain closure of the gap between the laminated glass main body 11 and the door panel. Further, when the Young's modulus of the viscoelastic member 13A is lower than that of the inner seal member 41, by the above-described structure, a constraining type vibration suppressing structure with respect to the laminated glass main body 11 can be obtained. Incidentally, high sound insulating performance by closure of the gap and suppressing vibrations of the laminated glass can be obtained, so that the structure in which the outer peripheral surface of the viscoelastic member 13A comes into contact with the entire surface of the inner peripheral surface of the inner seal member 41, which is on the laminated glass 1A side, is preferred. The same is true of the relationship between the viscoelastic member 13B and the outer seal member 42.

In the automobile door 3 illustrated in FIG. 4, the viscoelastic member 13A has, in the outer peripheral surface, a surface 13Aa being substantially parallel to the automobile interior-side surface Sa of the laminated glass main body 11, the inner seal member 41 has a surface 41*a* facing and being substantially parallel to the automobile interior-side surface Sa of the laminated glass main body 11 between the upper inner lip 411 and the lower inner lip 412, and at a closed time, the surface 13Aa of the viscoelastic member 13A is in contact with the surface 41*a* of the inner seal member 41 so that they match substantially entirely. In this specification, "an another surface is substantially parallel to a predetermined surface" means that an angle formed by the predetermined surface and the another surface is within 10 degrees. Further, similarly, the viscoelastic member 13B has, in the outer peripheral surface, a surface 13Ba being substantially parallel to the automobile exterior-side surface Sb of the laminated glass main body 11, the outer seal member 42 has a surface 42*a* facing and being substantially parallel to the automobile exterior-side surface Sb of the laminated glass main body 11 between the upper outer lip 421 and the lower outer lip 422, and at a closed time, the surface 13Ba of the viscoelastic member 13B is in contact with the surface 42*a* of the outer seal member 42 so that they match substantially entirely. In the constraining type vibration suppressing structure with respect to the laminated glass, a structure in which the viscoelastic member is held sandwiched between a surface of the laminated glass main body and a surface being parallel to the surface of the laminated glass main body, as described above is preferred.

In this case, for example, if the viscoelastic member is in contact with substantially the entire surface of the surface that the inner seal member has, which faces and is substantially parallel to the automobile interior-side surface of the laminated glass main body, a lower edge of the upper inner lip and an upper edge of the lower inner lip are not necessarily required to be in contact with the viscoelastic member. The same is true of the relationship between the outer seal member and the viscoelastic member, and the structure illustrated in FIG. 4 is more preferred.

FIG. 5 is a view schematically illustrating a cross-sectional view taken along the A-A'-A" line in FIG. 2 of an automobile door 3 including laminated glass 1B at a closed time and at an opened time of the laminated glass 1B. A door panel 2 in FIG. 5 has the same structure as that of the door panel 2 illustrated in FIG. 3. The laminated glass 1B is installed in the door panel 2 so that in a laminated glass main body 11, a surface Sa on a glass plate 11A side is located on the automobile interior side and a surface Sb on a glass plate 11B side is located on the automobile exterior side.

The laminated glass 1B illustrated in FIG. 5 has the same laminated glass main body 11 as that of the laminated glass 1 illustrated in FIG. 1 and FIG. 3. The entire cross-sectional view of the laminated glass 1B is illustrated in the drawing at an opened time in FIG. 5. The laminated glass 1B includes the laminated glass main body 11 and a viscoelastic member 13C provided in a lower portion on the automobile interior-side surface Sa.

In FIG. 5, the laminated glass 1B at a closed time is lowered in an arrow P1 direction, and a state where it is lowered completely is an opened time. The laminated glass 1B at an opened time is raised in an arrow P2 direction, and a state where it is raised completely is a closed time. The viscoelastic member 13C that the laminated glass 1B has is provided at a predetermined position in the lower portion on the automobile interior-side surface Sa of the laminated glass main body 11 so as to be able to seal a gap between the laminated glass main body 11 and the automobile interior side of the door panel 2 from a lower inner lip 412 to the inner panel 21 at a closed time.

The viscoelastic member 13C that the laminated glass 1B has is the same as the viscoelastic member 13 on the laminated glass 1 illustrated in FIG. 1 and FIG. 3 except that its shape is different. The viscoelastic member 13C is not limited in particular as long as it has a cross-sectional shape that allows sealing of the gap between the laminated glass main body 11 and the automobile interior side of the door panel 2 from the lower inner lip 412 to the inner panel 21. The viscoelastic member having such a cross-sectional shape as that of the viscoelastic member 13C is preferred because the viscoelastic member seals the gap between the laminated glass main body and these members from the lower portion of the inner seal member to the inner panel, to thereby increase the sound insulating effect.

The viscoelastic member 13, the viscoelastic members 13A, 13B, and the viscoelastic member 13C on the laminated glass 1, the laminated glass 1A, and the laminated glass 1B illustrated in FIG. 3 to FIG. 5 can be made the same in properties such as a composing material except for the cross-sectional shape. Hereinafter, the properties of the viscoelastic member will be explained in detail by using the viscoelastic member 13 on the laminated glass 1 as an example.

The viscoelastic member 13 on the laminated glass 1 is preferred to be elastically transformable moderately. As long as the viscoelastic member 13 is elastically transformable, for example, in the case where the thickness of the viscoelastic member 13 is larger than a distance between the laminated glass 1 and the inner panel 21 at an opened time, the viscoelastic member 13 is elastically transformed so as to gradually decrease in thickness from the upper side to the lower side in the traveling direction (P2 direction) during a process where the viscoelastic member 13 is inserted into the gap between the laminated glass 1 and the inner panel 21 to be constrained therebetween at a time when the laminated glass 1 is closed from an opened time of the laminated glass 1. Consequently, the viscoelastic member 13 decreases in thickness at a closed time of the laminated glass 1 as compared to the opened time. This makes it possible to seal the gap between the laminated glass main body 11 and the inner panel 21 at a closed time of the laminated glass 1 more tightly and form a more stable constraining type vibration suppressing structure. Thus, the sound insulating effect by the viscoelastic member 13 is improved.

The thickness of the viscoelastic member 13 is not particularly limited as long as the thickness allows a constraint between the laminated glass main body 11 and the inner panel 21. The thickness can be set appropriately according to the distance between the laminated glass main body 11 and the inner panel 21. Further, a vertical width of the viscoelastic member 13 is set so as to obtain a sufficient sound insulating effect in a range where the upper end of the viscoelastic member 13 reaches the lower end of the inner seal member 41 at a closed time of the laminated glass.

The viscoelastic member 13 is provided at a predetermined position in the lower portion on the automobile interior-side surface Sa of the laminated glass main body 11. The viscoelastic member 13 preferably extends horizontally between right and left ends of the laminated glass main body 11, that is, extends parallel to the beltline L, in the horizontal direction, and is not necessarily required to extend continuously. From the viewpoint of obtaining a sound insulating effect by closure of the gap between the laminated glass main body and the door panel and the constraint type vibration suppressing structure with respect to the laminated glass at a high level, the viscoelastic member 13 is preferably provided at a predetermined position in the vertical direction on the automobile interior-side surface Sa of the laminated glass main body 11 in a manner to continuously extend between the right and left ends.

Incidentally, in the case where the viscoelastic member 13 is provided at a predetermined position in a lower portion on the automobile exterior-side surface Sb of the laminated glass main body 11, from the viewpoint of obtaining the sound insulating effect at a high level, the viscoelastic member 13 is preferably provided at a predetermined position in the vertical direction on the automobile exterior-side surface Sb of the laminated glass main body 11 in a manner to continuously extend between the right and left ends. However, on the automobile exterior side of the laminated glass 1, rainwater or the like enters the gap between the laminated glass main body 11 and the outer seal member 42. Therefore, considering good drainage of rainwater or the like, the viscoelastic member may partially have a slit therein in the horizontal direction when being provided on the automobile exterior side.

The viscoelastic member 13 is not limited in material in particular as long as it is formed of a viscoelastic material. Incidentally, when the viscoelastic member is such a viscoelastic member as to abut on the seal member at a closed time to seal the gap between the laminated glass main body and the seal member, which is, for example, the viscoelastic members 13A and 13B illustrated in FIG. 4, the viscoelastic member preferably has a Young's modulus lower than that of the seal member. Incidentally, the Young's modulus cited in this specification means a Young's modulus ($N/m^2$) measured at 20° C. unless otherwise noted.

As the viscoelastic material fat ming the viscoelastic member 13, there can be used, concretely, a synthetic rubber such as an ethylene propylene rubber (EPDM rubber), a thermoplastic elastomer resin such as a polyolefin based elastomer, a polyurethane resin, a polyvinyl chloride resin, an epoxy resin, a silicone gel, polynorbornene, or the like.

The viscoelastic member 13 may be formed of a foam. In the case where the viscoelastic member 13 is formed of a foam, the viscoelastic member 13 can be formed by foaming, for example, a foam raw material by a conventional means. This makes it possible to adjust the Young's modulus and the loss factor of the viscoelastic member 13 to desired values. Further, when the viscoelastic member 13 has a laminated structure as will be described later, the viscoelastic member 13 preferably contains a layer formed of a foam. The case where the viscoelastic member 13 contains a foam composition is preferred because it is possible to expect a synergistic effect of a sealing property of the gap between the laminated glass main body and the panel board and/or the seal member and sound absorbency of the viscoelastic member containing the foam.

Further, the viscoelastic member 13 may be formed of a plurality of materials. That is, the viscoelastic member 13 may be formed of a single material such as the above-described synthetic rubber, thermoplastic elastomer resin, or foam, for example, or may also be formed of a plurality of combined materials of two or more kinds of these. Further, a viscoelastic material made by adding a filler such as an organic filler or a mineral filler to the above-described synthetic rubber, thermoplastic elastomer resin, foam, or the like may be used.

As the organic filler, there is used, for example, a resin particle formed of a resin such as a cross-linked polyester, a polystyrene, a styrene acrylic copolymer resin or a urea resin, a synthetic fiber, or a natural fiber. As the mineral filler, there is used, for example, a calcium carbonate, a calcium oxide, a magnesium hydroxide, a magnesium oxide, a magnesium carbonate, an aluminum hydroxide, a barium sulfate, a barium oxide, a titanium oxide, an iron oxide, a zinc oxide, a zinc carbonate, a clay such as a pyrophylite clay, a kaolin clay or a baked clay, mica, diatomaceous earth, carbon black, a silica, a glass fiber, a carbon fiber, a fiber filler, a nonorganic filler such as glass balloon, or the like. By using a material obtained by adding the filler to the viscoelastic material, the Young's modulus and the loss factor of the viscoelastic member 13 can be adjusted to desired values.

Further, in the viscoelastic member 13, a Young's modulus E ($N/m^2$) at 20° C. and a loss factor tan(δ) at 20° C. and a frequency of 4000 Hz preferably satisfy the following expression (1). Hereinafter, the loss factor indicates a value at 20° C. and a frequency of 4000 Hz unless otherwise noted.

$$E \geqq 2.64 \times 10^2 \frac{1+\tan^2(\delta)}{\tan(\delta)}. \tag{1}$$

In the above, the Young's modulus E is an index to measure a hardness of the viscoelastic member 13, and the loss factor tan δ is an index to measure a viscosity of the viscoelastic member 13. As a result that the Young's modulus E and the loss factor tan δ are in ranges satisfying the above expression (1), the viscoelastic member 13 exhibits a sound intrusion preventing effect and a vibration suppression effect with respect to the laminated glass 1 in a balanced manner, to come to have an excellent sound insulating effect. Particularly, the viscoelastic member 13 can sufficiently exhibit the vibration suppression effect with respect to the laminated glass 1 in such a constraining type vibration suppressing structure as described above.

Further, in the viscoelastic member 13, the above-described loss factor tan(δ) preferably satisfies the following expression (2).

$$E \geqq 1.65 \times 10^5 \frac{1+\tan^2(\delta)}{\tan(\delta)} \tag{2}$$

The viscoelastic member 13 may have a single-layer structure composed of a single layer, or may also have a laminated structure composed of a plurality of layers. When the viscoelastic member 13 has a laminated structure, a layer is laminated, for example, in a direction from the laminated glass main body side to the automobile interior side. When the viscoelastic member 13 has a laminated structure, the relationship between a Young's modulus and a loss factor of the entire laminated structure preferably satisfies the above-described expression (1). When having a laminated structure, the viscoelastic member 13 can be composed to have a laminated structure of two layers in which on at least one surface of a soft layer whose Young's modulus is relatively low, another layer other than the soft layer (to be also referred to as "another layer" simply hereinafter) is provided, a laminated structure of three or more layers in which on both surfaces of a soft layer, the another layers are each provided, or the like. The Young's modulus of the soft layer being relatively low means that the Young's modulus of the soft layer is lower than that of the another layer composing the viscoelastic member 13.

When the viscoelastic member 13 is composed to have the laminated structure of three or more layers in which the another layers are each provided on both surfaces of the soft layer, adhesiveness to the laminated glass main body 11 or the inner panel 21 may be provided to the uppermost surface layer, which is the another layer, in contact with the laminated glass main body 11 or the inner panel 21. This makes it possible to increase adhesiveness of the viscoelastic member 13 to the laminated glass main body 11 or the inner panel 21, so that it is possible to prevent sound intrusion from the gap. Furthermore, a more stable constraining type vibration suppressing structure can be formed, so that it is possible to improve the sound insulating effect.

Providing the viscoelastic member 13 on the automobile interior-side surface Sa of the laminated glass main body 11 is performed by adhesion, for example. An adhesion method is not particularly limited as long as it is a method having an adhesive strength sustainable against a force to tear off the viscoelastic member 13 that occurs when the viscoelastic member 13 is inserted into the gap between the laminated glass main body 11 and the inner panel 21 or released from gap therebetween by closing or opening of the laminated glass 1. Concretely, adhesion can be performed by a well-known double-sided adhesive tape, an adhesive agent, or the like. As long as the same adhesion method as that used for the viscoelastic member 13 is used also for the viscoelastic members 13A, 13B, and 13C, it is possible to provide, to the viscoelastic members 13A, 13B, and 13C, an adhesive strength sustainable against a force to tear off them when the laminated glass 1A and 1B are opened and closed.

The laminated glass according to the embodiment is laminated glass that satisfies both a rigidity against sucking out and high sound insulating performance when a window is closed, which are required for laminated glass for an automobile door, as well as being able to correspond to a weight reduction.

The automobile door according to an embodiment of the present invention includes the laminated glass according to the above-described present invention. As the automobile door according to the embodiment, for example, a composition including the door panel 2 and the laminated glass 1, the laminated glass 1A, or the laminated glass 1B is cited as illustrated in FIG. 3 to FIG. 5.

(Door Panel)

The door panel 2 to combine with the laminated glass 1 or the laminated glass 1B is not limited in particular as long as it is a door panel to form an ordinary automobile side door. In the door panel that forms the ordinary automobile side door, a panel board has a Young's modulus higher than that of a viscoelastic member, and at a closed time illustrated in FIG. 3 and FIG. 5, the viscoelastic member 13 or the viscoelastic member 13C is constrained between the laminated glass main body 11 and the panel board (inner panel) 21, and thereby a constraining type vibration suppressing structure can be formed. Further, a seal member can employ the same composition as that of an ordinary seal member. The ordinary seal member only needs to include at least a single lip portion, for example.

In the door panel 2 to combine with the laminated glass 1A, the inner panel 21 and the outer panel 22 that the door panel 2 has are not limited in material and shape in particular as long as they are panel boards forming a door panel of an automobile side door normally. With reference to FIG. 4, there are explained the inner seal member 41 and the outer seal member 42 that the inner panel 21 and the outer panel 22 have respectively in regions along the beltline L of their facing surfaces. Incidentally, only the inner seal member 41 on the automobile interior side is explained below, but the outer seal member 42 on the automobile exterior side can be formed in the same manner as the inner seal member 41.

In the automobile door 3 illustrated in FIG. 4, the inner seal member 41 that the door panel 2 has is formed of a material having a moderate Young's modulus that functions similarly to a seal member used for a beltline portion normally, and preferably formed of a material having a Young's modulus higher than that of the material forming the viscoelastic member 13A, and has two lip portions vertically on the laminated glass 1A side, namely the upper inner lip 411 and the lower inner lip 412. The inner seal member 41 only needs to have at least two lip portions located so as to sandwich the viscoelastic member 13A while abutting on at least a part of the viscoelastic member 13A at a closed time of the laminated glass 1A. The number of lip portions that the inner seal member 41 has is not limited in particular as long as the number is two or more, and it is preferably two from the viewpoint of capable of securing a large volume of the space where the viscoelastic member 13A is sandwiched, the viewpoint of manufacturing cost, and the like.

The inner seal member 41 is not limited in particular as long as it has a shape that allows sealing of the gap between the inner panel 21 and the laminated glass main body 11 by the two lip portions that the inner seal member 41 has vertically on the laminated glass 1A side, namely the upper inner lip 411 and the lower inner lip 412 at a closed time of the laminated glass 1A. The shapes of the upper inner lip 411 and the lower inner lip 412 are shapes that allow sealing of the gap between the inner panel 21 and the laminated glass main body 11 at a closed time, and at the same time, allow the viscoelastic member 13A to be held sandwiched between the upper inner lip 411 and the lower inner lip 412.

In the automobile door 3 illustrated in FIG. 4, the viscoelastic member 13A has a shape with its outer peripheral surface coming into contact with substantially the entire surface of the inner peripheral surface of the inner seal member 41, which is on the laminated glass 1A side, at a closed time of the laminated glass 1A. Here, the inner peripheral surface of the inner seal member 41, which is on the laminated glass 1A side, is composed of the lower side of the upper inner lip 411, the upper side of the lower inner lip 412, and the surface 41*a* facing and being substantially parallel to the automobile interior-side surface Sa of the laminated glass main body 11 located between the upper inner lip 411 and the lower inner lip 412.

As above, the inner seal member 41 preferably has a shape with its inner peripheral surface matching the outer peripheral surface of the viscoelastic member 13A. Further, the inner seal member 41 preferably has the surface 41*a* facing and being substantially parallel to the automobile interior-side surface Sa of the laminated glass main body 11 between the upper inner lip 411 and the lower inner lip 412. Application of such a composition enables formation of the vibration suppressing structure with respect to the laminated glass main body 11 in which the gap between the laminated glass main body 11 and the door panel 2, concretely the gap between the laminated glass main body 11 and the inner seal member 41 is sufficiently closed at a closed time of the laminated glass 1A, and at the same time, the laminated glass main body 11 and the inner seal member 41 constrain the viscoelastic member 13A.

The lip portions that the inner seal member 41 and the outer seal member 42 have are each preferably formed to have a shape and/or of a material that allow changing of the tip portion in direction as the laminated glass 1A is raised and lowered, for example. From this viewpoint, the inner seal member 41 and the outer seal member 42 can be formed of a synthetic rubber such as an EPDM rubber, a thermoplastic elastomer such as a polyolefin based elastomer, or the like. Incidentally, the composing materials of the inner seal member 41 and the outer seal member 42 are each preferred to be a material having a Young's modulus higher than that of the composing materials of the viscoelastic member 13A and the viscoelastic member 13B.

Incidentally, it is also possible to form only the lip portions of the inner seal member 41 of a material different from the above, and from the viewpoint of economic efficiency, the entire inner seal member 41 including the lip portions is preferably formed of the same material. The same is true of the outer seal member 42.

Use of the laminated glass of the present invention allows the automobile door according to the embodiment of the present invention to satisfy both a rigidity against sucking out of the laminated glass and high sound insulating performance when a window is closed as well as to achieve a weight reduction.

EXAMPLE

Hereinafter, the present invention will be explained in more detail with examples. The present invention is not limited at all to an embodiment and examples to be explained below.

Example 1

An automobile door 3 obtained by installing laminated glass 1B in a door panel 2 with the same composition as that illustrated in FIG. 5 was manufactured, and its sound insulating performance was evaluated. Incidentally, a laminated glass main body 11 used for the laminated glass 1B was formed in the same manner as the laminated glass main body 11 of the laminated glass 1 illustrated in FIG. 1.

(Manufacture of Laminated Glass Main Body 11)

(1) Manufacture of Interlayer Film 12

As resin films for the skin layer 12A on the automobile interior side and the skin layer 12B on the automobile exterior side, ordinary interlayer films (S-LEC Clear Film (product name)) manufactured by SEKISUI CHEMICAL CO., LTD. were left to stand for 200 hours at 100° C. and a plasticizer was dispersed, to thereby prepare hard PVB films. Each storage modulus G' of the hard PVB films, which was measured under the same condition as those of the later-described interlayer film 12, was $1.2\times10^8$ Pa.

As a resin for the core layer 12C, a core layer of a sound insulation interlayer film (S-LEC Sound Acoustic Film) manufactured by SEKISUI CHEMICAL CO., LTD. was isolated to be left to stand for 100 hours at 100° C. and a plasticizer was dispersed, to thereby prepare a soft PVB film. A storage modulus G' of the soft PVB film, which was measured under the same condition as those of the later-described interlayer film 12, was $0.3\times10^6$ Pa.

The obtained hard PVB films and soft PVB film were used to be laminated, in the order of the automobile interior-side skin layer 12A, the core layer 12C and the automobile exterior-side skin layer 12B, namely in the order of the hard PVB film, the soft PVB film and the hard PVB film and pressed by a hot press forming machine at 150° C., for 300 seconds, and at a press pressure of 50 kg/cm$^2$ to be adjusted, and thereby the interlayer film 12 including the hard PVB films being the automobile interior-side skin layer 12A and the automobile exterior-side skin layer 12B, each having a thickness of 350 μm, and the soft PVB film being the core layer 12C, having a thickness of 150 μm was manufactured.

A storage modulus G' of the obtained interlayer film 12 was measured in a dynamic viscoelasticity test measured by a shearing method under the condition at a frequency of 1 Hz, a dynamic shearing strain of 0.015%, and a temperature of 20° C. using a Rheometer MCR301 manufactured by Anton Paar GmbH, and then the storage modulus G' was $4.0\times10^6$ Pa.

(2) Manufacture of Laminated Glass Main Body 11

A glass plate 11A having a thickness of 2 mm, the interlayer film 12, (where the automobile interior-side skin layer 12A side was set to the glass plate 11A side), and a glass plate 11B having a thickness of 2 mm were laminated, and an obtained laminate was put in a vacuum bag and subjected to compression bonding at 110° C. while deaeration was being performed to bring the inside of the vacuum bag into a pressure reduction degree of −60 kPa or less, and then subjected to further compression bonding under a condition at a temperature of 140° C. and a pressure of 1.3 MPa, and thereby the laminated glass was obtained. Incidentally, the used glass plates 11A and 11B were each soda lime glass.

(Manufacture of Laminated Glass 1B)

As the viscoelastic member 13C, a sound insulation sheet MTS-20 (product name, manufactured by Hayakawa Rubber Co. Ltd.) was prepared. Incidentally, a Young's modulus E (N/m$^2$) at a temperature of 20° C. and a loss factor tan(δ) at a frequency of 4000 Hz and a temperature of 20° C. of the MTS-20 satisfy the above-described expression (1). The viscoelastic member 13C had a length of about 850 mm and a cross-sectional shape allowing the viscoelastic member 13C to abut on both a seal member 41 and a panel board 21 at a closed time of the laminated glass 1B to seal a gap between the laminated glass main body 11 and the seal member 41 and the panel board 21, similarly as illustrated in FIG. 5.

The viscoelastic member 13C was put at a predetermined position in a lower portion on the automobile interior-side surface Sa of the laminated glass main body 11 with an adhesive agent so that the length direction of the viscoelastic member 13C became parallel to the beltline. Incidentally, the predetermined position is a position that allows the viscoelastic member 13C to seal the gap between the laminated glass main body 11 and the automobile interior side of the door panel 2 from a lower inner lip 412 to an inner panel 21 in a state of the laminated glass 1B being closed after installation of the laminated glass 1B in the following door panel 2. Further, the viscoelastic member 13C was one extending between right and left ends of the laminated glass main body 11.

(Manufacture of Automobile Door 3)

As the door panel 2, a door panel 2 exhibiting the same cross section of the beltline portion Ls as that illustrated in FIG. 5, which is for an automobile front door, namely a door panel 2 having two panel boards 21 and 22 facing each other and seal members 41 and 42 provided in beltline portions Ls of facing surfaces of the panel boards 21 and 22 was used. The laminated glass 1B was installed in a liftable manner so as to be located between the seal members 41 and 42 of the door panel 2.

[Sound Insulating Property Measurement of Automobile Door]

A sound transmission loss (STL) on the automobile interior side of the obtained automobile door 3 was measured at 20° C. and 50% RH in a state of the laminated glass 1B being closed (in a state at a closed time) in conformity with SAE J1400 in the case where a sound source was placed outside an automobile. Incidentally, this measurement is intended to measure the sound insulating property of the entire automobile door 3.

Comparative Example 1

The laminated glass main body 11 in Example 1, namely the laminated glass 1B in Example 1 not having the viscoelastic member 13C was, as laminated glass in Comparative example 1, installed in the same door panel 2 as in Example 1 to manufacture an automobile door. The sound insulating property of the obtained automobile door in Comparative example 1 was measured in the same manner as in Example 1.

Reference Example 1

Figure 6:
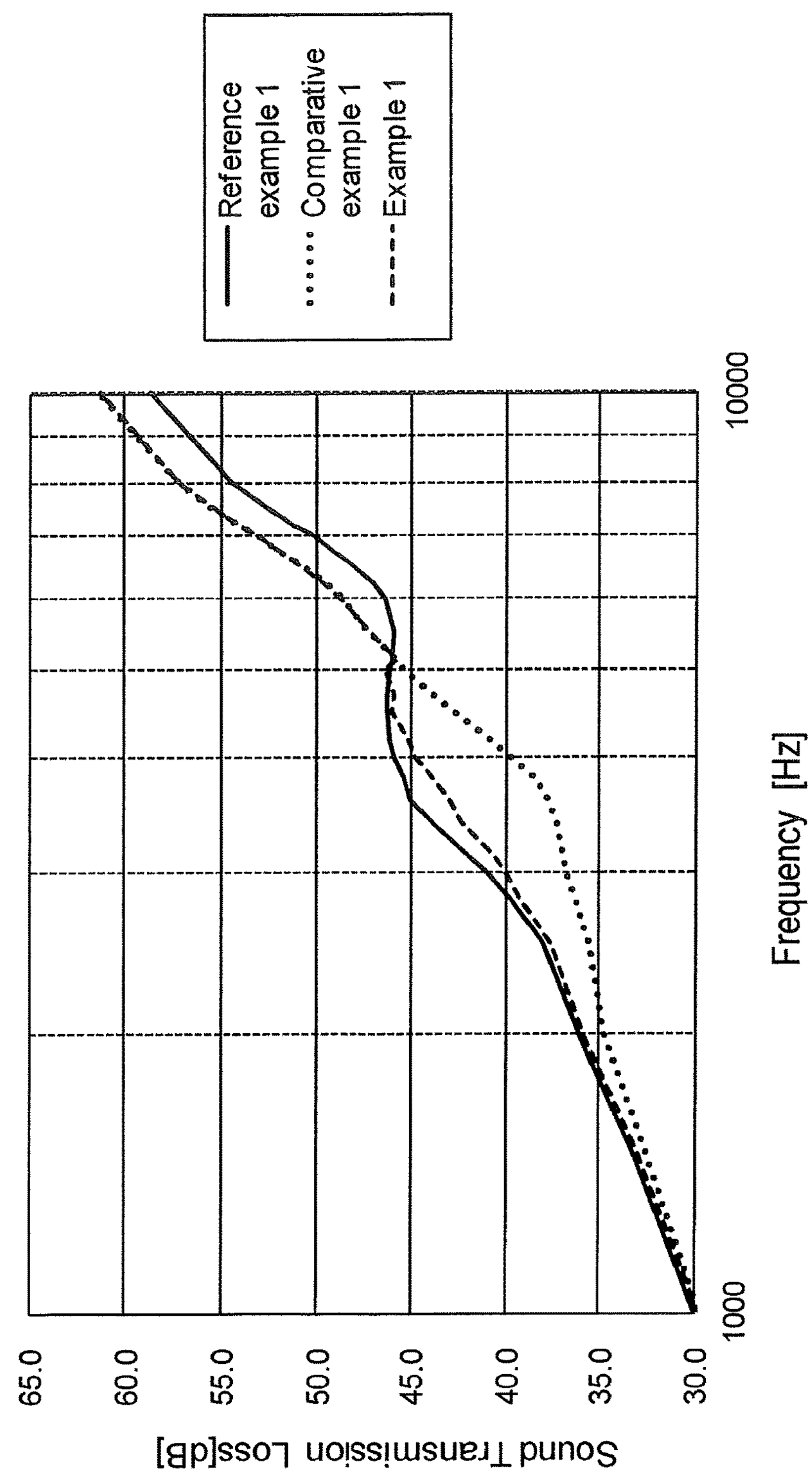
FIG. 6 is a graph illustrating sound insulating performances in automobile doors using laminated glasses of Examples.

An interlayer film of the laminated glass in Comparative example 1 was replaced with a sound insulation interlayer film (S-LEC Sound Acoustic Film (product name), with the storage modulus G' measured in the same manner as in Example 1 of $1.4\times10^6$ Pa manufactured by SEKISUI CHEMICAL CO., LTD.), and laminated glass in Reference example 1 (not having the viscoelastic member 13C) was obtained. The obtained laminated glass in Reference example 1 was installed in the same door panel 2 as in Example 1 to manufacture an automobile door. The sound insulating property of the obtained automobile door in Reference example 1 was measured in the same manner as in Example 1. Obtained results are illustrated in Table 1 below and FIG. 6.

TABLE 1

| Frequency [Hz] | Sound transmission loss [dB] Example 1 | Comparative example 1 | Reference example 1 |
|---|---|---|---|
| 100 | 7.8 | 7.8 | 7.8 |
| 200 | 13.4 | 13.4 | 13.4 |
| 500 | 23.6 | 23.6 | 23.7 |
| 1000 | 29.8 | 29.8 | 30.1 |
| 1500 | 33.1 | 32.6 | 33.3 |
| 2000 | 35.9 | 34.8 | 36.1 |
| 2500 | 37.6 | 35.6 | 38.0 |
| 2800 | 39.3 | 36.3 | 39.7 |
| 3000 | 40.1 | 36.8 | 41.1 |
| 3100 | 40.6 | 37.0 | 41.9 |
| 3400 | 42.4 | 37.3 | 43.8 |
| 3600 | 43.0 | 37.8 | 45.0 |
| 3800 | 43.8 | 38.4 | 45.3 |
| 4000 | 44.8 | 39.8 | 45.9 |
| 4200 | 45.1 | 41.0 | 46.2 |
| 4500 | 46.0 | 42.7 | 46.2 |
| 4700 | 45.9 | 43.9 | 46.3 |
| 5000 | 46.4 | 45.4 | 46.2 |
| 5100 | 45.8 | 45.8 | 46.1 |
| 5500 | 47.2 | 47.2 | 45.9 |
| 6000 | 48.8 | 48.8 | 46.4 |
| 6200 | 49.5 | 49.5 | 46.9 |
| 6500 | 50.8 | 50.8 | 48.0 |
| 6700 | 51.9 | 51.9 | 49.0 |
| 7000 | 53.1 | 53.1 | 50.3 |
| 7200 | 54.1 | 54.1 | 51.2 |
| 7500 | 55.4 | 55.4 | 52.6 |
| 8000 | 57.2 | 57.2 | 54.5 |
| 9000 | 59.4 | 59.4 | 56.7 |
| 10000 | 61.3 | 61.3 | 58.7 |

The above-described results reveal that the laminated glass in Example 1 can correspond to a weight reduction and has a high sound insulating property when a window is closed because the interlayer film has a high rigidity. The laminated glass in Example 1 has a sufficient rigidity while having a high sound insulating property when a window is closed even when, for example, the thickness of the glass plates 11A and 11B is set to fall within a preferred range of the present invention to achieve a weight reduction. The laminated glass in Comparative example 1 can correspond to a weight reduction because the interlayer film has a high rigidity, but has a problem in terms of the sound insulating property when a window is closed. A comparison between Example 1 and Comparative example 1 reveals that the weight reduction, the sound insulating property, and a rigidity against sucking out in the laminated glass can be all achieved at a high level due to a synergistic effect of respective functions of the laminated glass main body 11 and the viscoelastic member 13 in the present invention. The laminated glass in Reference example 1 has an excellent sound insulating property at a closed time of a window, but has difficulty in corresponding to the weight reduction because the rigidity of the interlayer film is not sufficient.

What is claimed is:

1. A laminated glass provided in an automobile door panel including two panel boards facing each other and seal members provided on facing surfaces of the panel boards at regions along a beltline, the laminated glass being openable and closable by being provided between the two panel boards so as to slide between the seal members, the laminated glass comprising:

a laminated glass main body including at least two glass plates and an interlayer film sandwiched between the glass plates and having a storage modulus G' of $1.5\times10^6$ Pa or more measured by a dynamic viscoelasticity test under a condition at a frequency of 1 Hz, a dynamic shearing strain of 0.015%, and a temperature of 20° C.; and a viscoelastic member provided on a surface of the laminated glass main body, the viscoelastic member abutting on the seal member or the panel board and sealing a gap between the seal member or the panel board and the laminated glass main body, at a closed time of the laminated glass wherein the viscoelastic member has a smaller thickness at a closed state of the laminated glass than at an opened state.

2. The laminated glass according to claim 1, wherein the interlayer film has a three-layer structure composed of a core layer of a single layer and a pair of skin layers holding the core layer sandwiched therebetween.

3. The laminated glass according to claim 2, wherein storage moduli G' of the skin layers are larger than a storage modulus G' of the core layer.

4. The laminated glass according to claim 2, wherein a storage modulus G' of the core layer is $1.0\times10^4$ Pa or more and $1.0\times10^7$ Pa or less.

5. The laminated glass according to claim 2, wherein storage moduli G' of the skin layers are $5.0\times10^6$ Pa or more and $1.3\times10^8$ Pa or less.

6. The laminated glass according to claim 2, wherein the core layer and the skin layers are made of a polyvinyl acetal resin.

7. The laminated glass according to claim 1, wherein in the viscoelastic member, a Young's modulus E ($N/m^2$) at a temperature of 20° C. and a loss factor tan(δ) at a frequency of 4000 Hz and a temperature of 20° C. satisfy the following expression (1)

$$E \geqq 2.64\times10^2\frac{1+\tan^2(\delta)}{\tan(\delta)}. \quad (1)$$

8. The laminated glass according to claim 1, wherein the viscoelastic member is formed of a plurality of materials.

9. The laminated glass according to claim 1, wherein the viscoelastic member includes a layer formed of a foam.

10. The laminated glass according to claim 1, wherein a total thickness of the glass plates is 3.3 mm or less.

11. An automobile door comprising the laminated glass according to claim 1.

12. The laminated glass according to claim 1, wherein a thickness of each glass plate is 1.0 mm or more and 2.0 mm or less.

13. The laminated glass according to claim 12, wherein a thickness of each glass plate is 1.0 mm or more and 1.8 mm or less.

14. The laminated glass according to claim 1, wherein a storage modulus G' of the interlayer film is $2.0\times10^6$ Pa or more.

15. The laminated glass according to claim 14, wherein a storage modulus G' of the interlayer film is $3.0\times10^6$ Pa or more.

16. The laminated glass according to claim 1, wherein a loss factor of the interlayer film is 0.2 or more and 0.6 or less at at least one resonance point under a frequency of 3 to 6 KHz and a temperature of 20° C.

17. The laminated glass according to claim 1, wherein the laminated glass main body has a three point bend rigidity of 100 N/mm or more.

18. The laminated glass according to claim 1, wherein the viscoelastic member has a Young's modulus at 20° C. lower than that of the seal member.

19. The laminated glass according to claim 1, wherein the viscoelastic member has a loss factor tan(δ) satisfies the following expression (2)

$$E \geqq 1.65 \times 10^5 \frac{1 + \tan^2(\delta)}{\tan(\delta)}. \tag{2}$$

* * * * *